United States Patent
Sun et al.

(10) Patent No.: US 10,467,725 B2
(45) Date of Patent: Nov. 5, 2019

(54) MANAGING ACCESS TO A RESOURCE POOL OF GRAPHICS PROCESSING UNITS UNDER FINE GRAIN CONTROL

(71) Applicant: EMC IP Holding Company LLC, Hopkinton, MA (US)

(72) Inventors: Yifan Sun, Abington, MA (US); Layne Peng, Shanghai (CN); Robert A. Lincourt, Jr., Pawtucket, RI (US); John Cardente, Milford, MA (US); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/287,719

(22) Filed: Feb. 27, 2019

(65) Prior Publication Data
US 2019/0197655 A1 Jun. 27, 2019

Related U.S. Application Data

(63) Continuation of application No. 15/487,887, filed on Apr. 14, 2017, now Pat. No. 10,262,390.

(51) Int. Cl.
*G06T 1/20* (2006.01)
*G06F 9/50* (2006.01)
*G06F 9/48* (2006.01)

(52) U.S. Cl.
CPC .............. *G06T 1/20* (2013.01); *G06F 9/4881* (2013.01); *G06F 9/5038* (2013.01); *G06F 9/5077* (2013.01)

(58) Field of Classification Search
CPC .............................. G06F 9/4881; G06F 9/5077
See application file for complete search history.

(56) References Cited

U.S. PATENT DOCUMENTS 8,938,416 B1 1/2015 Cole et al.
9,384,583 B2 7/2016 Diard
(Continued)

OTHER PUBLICATIONS

Minsoo Rhu et al., "vDNN: Virtualized Deep Neural Networks for Scalable, Memory-Efficient Neural Network Design," 49th IEEE/ACM International Symposium on Microarchitecture (Micro-49), 2016, 13 pages.
Tensorflow, "Tensor/Tensorflow," https://github.com/tensorflow/tensorflow/blob/master/tensorflow/python/training/saver.py, 2015, 32 pages.
S. Han et al., "Deep Compression: Compressing Deep Neural Networks with Pruning, Trained Quantization and Huffman Coding," arXiv:1510.00149v5, Published as a conference paper at International Conference on Learning Representations (ICLR), Feb. 16, 2016, 14 pages.
(Continued)

*Primary Examiner* — Grace Q Li
(74) *Attorney, Agent, or Firm* — Ryan, Mason & Lewis, LLP

(57) ABSTRACT

A graphics processing unit (GPU) service platform includes a control server, and a cluster of GPU servers each having one or more GPU devices. The control server receives a service request from a client system for GPU processing services, allocates multiple GPU servers within the cluster to handle GPU processing tasks specified by the service request by logically binding the allocated GPU servers, and designating one of the at least two GPU servers as a master server, and send connection information to the client system to enable the client system to connect to the master server. The master GPU server receives a block of GPU program code transmitted from the client system, which is associated with the GPU processing tasks specified by the service request, processes the block of GPU program code using the GPU devices of the logically bound GPU servers, and returns processing results to the client system.

20 Claims, 5 Drawing Sheets

(56) References Cited

U.S. PATENT DOCUMENTS

| | | | |
|---|---|---|---|
| 9,703,573 B1 | 7/2017 | Giefers et al. | |
| 9,836,354 B1 | 12/2017 | Potlapally et al. | |
| 9,984,648 B2 | 5/2018 | Chakraborty et al. | |
| 2008/0100626 A1* | 5/2008 | Diard | G06T 15/005 345/501 |
| 2008/0195843 A1 | 8/2008 | Muniandy | |
| 2009/0089560 A1 | 4/2009 | Liu et al. | |
| 2011/0131430 A1 | 6/2011 | Krishnamurthy et al. | |
| 2012/0011401 A1 | 1/2012 | Ranganathan et al. | |
| 2013/0311570 A1* | 11/2013 | Kuo | H04L 12/2818 709/204 |
| 2014/0198112 A1 | 7/2014 | Miyamoto et al. | |
| 2014/0325073 A1 | 10/2014 | Urbach | |
| 2015/0213163 A1 | 7/2015 | Yang et al. | |
| 2015/0271331 A1 | 9/2015 | Segre et al. | |
| 2015/0317192 A1 | 11/2015 | Munshi et al. | |
| 2016/0247248 A1 | 8/2016 | Ha et al. | |
| 2016/0253774 A1 | 9/2016 | Grebe et al. | |
| 2017/0132744 A1 | 5/2017 | Wilt et al. | |
| 2017/0220949 A1 | 8/2017 | Feng et al. | |
| 2017/0293758 A1 | 10/2017 | Saxena et al. | |
| 2017/0353397 A1 | 12/2017 | Che | |
| 2018/0075347 A1 | 3/2018 | Alistarh et al. | |

OTHER PUBLICATIONS

Tony Paikeday, "Seven Service Providers Delivering the GPU-Accelerated Cloud—Built on NVIDIA Grid," https://blogs.nvidia.com/blog/2016/09/27/the-gpu-accelerated-cloud/, Sep. 27, 2016, 4 pages.

amazon.com, "Linux Accelerated Computing Instances," http://docs.aws.amazon.com/AWSEC2/latest/UserGuide/using_cluster_computing.html, 9 pages.

Tiffany Trader, "Microsoft Puts GPU Boosters on Azure Cloud," https://www.hpcwire.com/2016/09/29/microsoft-puts-gpu-boosters-on-azure-cloud/, Sep. 29, 2015, 3 pages.

U.S. Appl. No. 15/391,223 filed in the name of Yifan Sun et al. filed Dec. 27, 2016 and entitled "Queue-Based GPU Virtualization and Management System."

U.S. Appl. No. 15/498,055 filed in the name of Junping Zhao et al. filed Apr. 26, 2017 and entitled "Intelligent Data Coordination for Accelerated Computing in Cloud Environment."

U.S. Appl. No. 15/496,568 filed in the name of Junping Zhao et al. filed Apr. 25, 2017 and entitled "Checkpointing for GPU-as-a-Service in Cloud Computing Environment."

\* cited by examiner

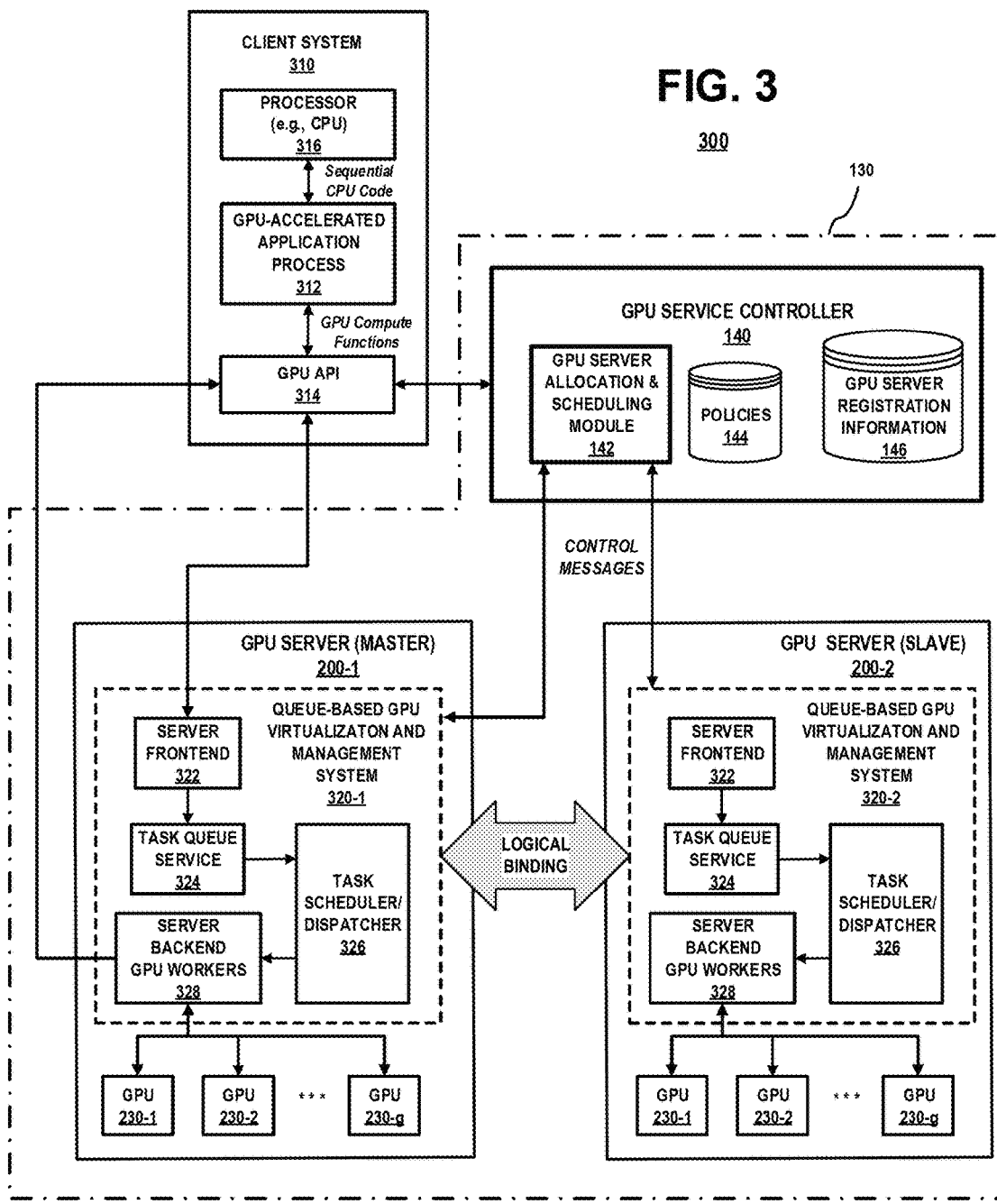

MANAGING ACCESS TO A RESOURCE POOL OF GRAPHICS PROCESSING UNITS UNDER FINE GRAIN CONTROL

CROSS-REFERENCE TO RELATED APPLICATION

This application is a Continuation of U.S. patent application Ser. No. 15/487,887, filed on Apr. 14, 2017, the disclosure of which is incorporated herein by reference.

FIELD

This disclosure relates generally to techniques for managing and utilizing processor resources in a computing system.

BACKGROUND

Various types of special-purpose processors, such as graphics processing units (GPUs) for general purpose computing, have been developed to accelerate the processing of specific types of workloads. Architecturally, a GPU has a massively parallel architecture which typically comprises hundreds or thousands of cores that are configured to concurrently execute hundreds or thousands of threads at a given time. This is in contrast to a standard central processing unit (CPU) architecture which typically comprises a few cores and associated cache memory, which are optimized for sequential serial processing and handling a few software threads at a given time.

The processing capabilities of GPU resources are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning, data mining, video data transcoding, image analysis, image recognition, virus pattern matching, augmented reality, encryption/decryption, weather forecasting, big data comparisons, and other applications with computational workloads that have an inherently parallel nature. Due to the high-throughput and low energy consumption per operation exhibited by GPUs, it is anticipated that GPU-as-a-Service (GPUaaS) will become mainstream in the near future, wherein cloud-based systems will implement GPU powered blades for various types of processing.

SUMMARY

Illustrative embodiments of the invention generally include systems and methods for implementing a GPU service platform that is configured to manage access to a resource pool of GPU devices. For example, one embodiment of the invention includes a method that is implemented by a GPU service platform. The GPU service platform receives a service request from a client system for GPU processing services provided by the GPU service platform. The GPU service platform comprises a server cluster of GPU server nodes, wherein each GPU server node within the server cluster comprises one or more GPU devices. The GPU service platform allocates at least two GPU server nodes within the cluster of GPU server nodes to handle GPU processing tasks specified by the service request, wherein allocating comprises logically binding the at least two GPU server nodes, and designating one of the at least two GPU server nodes as a master GPU server node. The GPU service platform sends connection information to the client system to enable the client system to establish a network connection to the master GPU server node. The master GPU server node receives a block of GPU program code transmitted from the client system over the network connection, wherein the block of GPU program code is associated with the GPU processing tasks specified by the service request. The block of GPU program code is processed using the GPU devices of the logically bound GPU server nodes under the control of the master GPU server node. The master GPU server node sends the processing results to the client system over the network connection.

Another embodiment includes a GPU service platform which comprises a control server, and a server cluster of GPU server nodes, wherein each GPU server node within the server cluster comprises one or more GPU devices. The control server is configured to: receive a service request from a client system for GPU processing services provided by the GPU service platform; allocate at least two GPU server nodes within the cluster of GPU server nodes to handle GPU processing tasks specified by the service request, wherein allocating comprises logically binding the at least two GPU server nodes, and designating one of the at least two GPU server nodes as a master GPU server node; and send connection information to the client system to enable the client system to establish a network connection to the master GPU server node. The master GPU server node is configured to: receive a block of GPU program code transmitted from the client system over the network connection, wherein the block of GPU program code is associated with the GPU processing tasks specified by the service request; process the block of GPU program code using the GPU devices of the logically bound GPU server nodes; and return processing results to the client system over the network connection.

Other embodiments of the invention include, without limitation, systems and articles of manufacture comprising processor-readable storage media.

BRIEF DESCRIPTION OF THE DRAWINGS

FIG. 3 schematically illustrates a run-time implementation of a client system and a GPU service platform, according to an embodiment of the invention.

DETAILED DESCRIPTION

Figure 1:
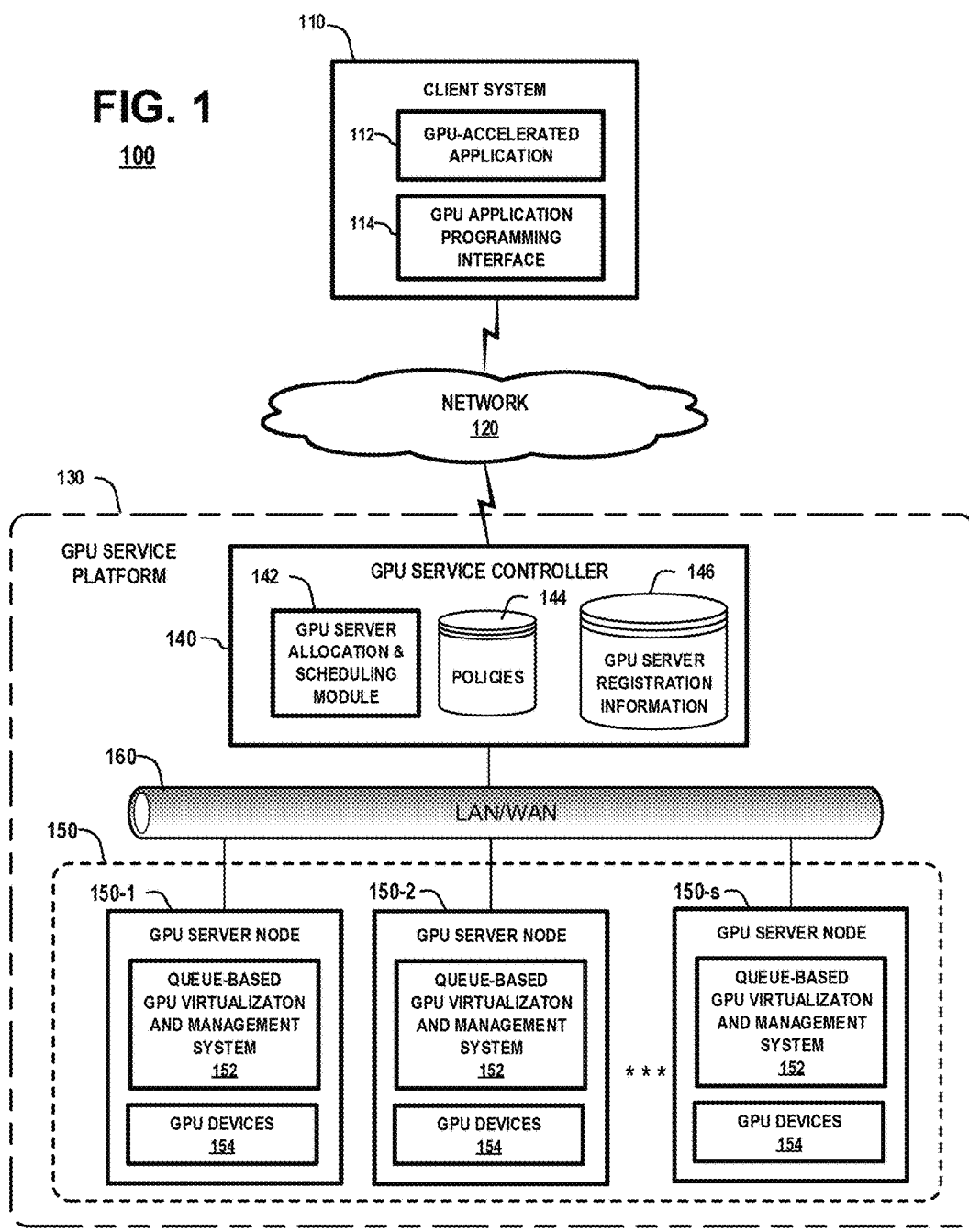
FIG. 1 is a high-level schematic illustration of a computing system which implements a GPU service platform that is configured to manage access to a resource pool of GPU devices under fine grain control, according to an embodiment of the invention.

Illustrative embodiments of the invention will now be explained in further detail with regard to systems and methods for implementing a GPU service platform that is configured to manage access to a resource pool of GPU devices under fine grain control. For example, in one embodiment, a GPU service platform is configured to support GPUaaS by managing and controlling a cluster of GPU server nodes in a way that allows multiple client applications to concurrently share a pool of GPU devices and resources provided by the cluster of GPU server nodes. When the GPU service platform receives a service request from a client application for GPU processing services, the GPU service platform will allocate either a single GPU server node or multiple GPU server nodes within the cluster of GPU server nodes to handle the service request depending on, e.g., the available GPU devices and processing resources of the GPU server nodes, the nature of the GPU processing tasks associated with the service request, and other relevant factors, etc.

For example, when the GPU processing tasks of a given service request cannot be handled using the GPU devices and resources of a single GPU server node within the cluster, the GPU service platform can dynamically scale the amount of GPU resources that can be allocated to handle the service request of the client system by logically binding two or more GPU server nodes in a peer-to-peer or master/slave configuration. The logical binding of multiple GPU server nodes presents a single logical GPU server node which logically combines the GPU devices and resources of the logically bound GPU server nodes to create a pool of GPU devices and resources that are mapped to the client system for consumption. In this configuration, the single logical GPU server node collectively utilizes the pool of GPU devices and resources across the logically bound GPU server nodes to execute the GPU processing tasks associated with the service request of the client system as if the pool of GPU devices and resources resided in a single GPU server node dedicated to the client system for handling the service request. In this model, the GPU service platform can provide GPU processing services to client systems using GPU devices and resources that are local to the GPU service platform (e.g., data center), or GPU devices and resources that are remotely located in another data center or cloud computing platform, or a combination of local and remotely located GPU devices and resources.

Embodiments of the invention provide advantages over conventional server-based implementations of GPUaaS. For example, in conventional GPU service systems, individual GPU devices are typically allocated to individual users on a dedicated basis, which can result in extremely low utilization of GPU devices. For example, in such conventional systems, a system administrator can only statically allocate GPU devices to users on an individual basis, whereby allocated GPU devices are not shared among the users. As a consequence, even when a GPU device allocated to a given user is currently idle for a period of time and not processing GPU tasks, other users cannot utilize the allocated GPU.

Another issue that arises with regard to server-based implementations of GPUaaS is that the amount and type of analytic processing tasks that can be supported by a given GPU server is constrained by the ability to package, power and cool multiple GPU devices within a single GPU server machine. Typically, a GPU server will house 1, 2, 4, or 8 GPU devices, with higher end GPU server systems coming at increasing cost. While the software capability for GPU continues to increase and more analytics applications are targeted for GPU-based resources, the GPU processing capabilities of a given GPU server will be constrained by current platform packaging technologies which limit the number of GPU devices that can be packaged in a given server machine.

Furthermore, while a high-end GPU server having a large number of GPU devices (e.g., 8 GPU devices) can be deployed to support a wide range of analytic processing tasks, such deployment could be very expensive and sit idle for a majority of time. In this deployment scheme, a system administrator must anticipate client requirements for GPU scale and acquire GPU server systems that could possibly support future application needs. However, in almost all fields that utilize GPU devices and resources, ranging from research and development, to production, GPU device utilization is typically very low. As such, the use of a high-end GPU server with multiple GPU devices can be a sub-optimal solution to GPU scaling since, for example, the GPU devices can be idle for long periods of time with GPU server resources being unused as a result of over provisioning, or GPU resources being outdated by the time such resources are actually needed, etc.

Embodiments of the invention as discussed herein address the drawbacks of conventional server-based GPUaaS systems by allowing multiple users to concurrently share GPU devices and resources of a given GPU server (temporally and/or spatially) without experiencing performance degradation. In addition, to solve the issue of GPU scaling, embodiments of the invention provide techniques to extend GPUaaS functionality by allowing multiple GPU servers to logically bind together to build a logical server across multiple GPU server nodes, thereby combining GPU resources to create a pool of GPU resources that can be utilized for handling GPU processing tasks requested by a client. These scaling techniques allow the GPUaaS system to present a larger logical pool of GPU devices than is available on any one GPU server node, and provides flexibility for a system administrator to acquire and apply GPU resources in smaller increments as needed.

FIG. 1 is a high-level schematic illustration of a computing system 100 which implements a GPU service platform that is configured to manage access to a resource pool of GPU devices under fine grain control, according to an embodiment of the invention. The computing system 100 comprises a client system 110, a communications network 120, and a GPU service platform 130. The client system 110 comprises a GPU-accelerated application 112, and a GPU application programming interface (API) 114. The GPU service platform 130 comprises a GPU service controller 140 (e.g., control server), a server cluster 150 (e.g., server farm) comprising a plurality of GPU server nodes 150-1, 150-2, . . . , 150-s, and a service platform network 160. The GPU service controller 140 comprises a GPU server allocation and scheduling module 142, a database of policies 144, and a database of GPU server registration information 146. As explained in further detail below, the databases 144 and 146 comprise various types of information that are managed and utilized by the GPU service controller 140 to perform various control functions. The GPU server nodes 150-1, 150-2, . . . , 150-s each comprise a queue-based GPU virtualization and management system 152, and one or more GPU devices 154.

The client system 110 generically represents any type of user computing device such as a desktop computer, a laptop computer, an electronic tablet, or any other type of client computing device having computing resources (e.g., processor, memory, etc.) to store and execute the GPU accelerated application 112, and the GPU API 114. In another embodiment, the client system 110 may comprise a server in a data center. The client system 110 is configured to access GPU resources, which are provided by the GPU service platform 130 over the communications network 120, to execute certain portions or kernels of the GPU-accelerated application 112, as will be discussed in further detail below.

While the communications network 120 is generically depicted in FIG. 1, it is to be understood that the communications network 120 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the communications network 120 in some embodiments comprises combinations of multiple different types of communications networks each comprising network devices configured to communicate using Internet Protocol (IP) or other related communication protocols. The communications network 120 comprises intermediate points (such as routers, switches, etc.) and other elements that form a network backbone to establish communication paths and enable communication between network endpoints.

In the client system 110, the GPU-accelerated application 112 comprises an application program having compute-intensive portions or routines (e.g., compute kernels) which are included within the program code of the GPU-accelerated application 112, and which are offloaded to a GPU device for accelerated computing. It is to be understood that the term "GPU-accelerated application" as used herein refers to any type of software application, including desktop applications, server applications, database applications, and mobile applications, which comprise executable GPU-related program code that is compiled for processing by high throughput accelerators such as GPUs.

The GPU API 114 comprises library functions and protocols that are configured to communicate with the GPU service platform 130 to access GPU processing services provided by GPU service platform 130. For example, the GPU API 114 is configured transmit a service request to the GPU service platform 130 to request GPU processing services provided by the GPU service platform 130. In addition, the GPU API 114 is configured to transmit blocks of application code (e.g., compute kernels) of the GPU-accelerated application 112 and any associated data, which are to be processed by one or more GPU server nodes within the server cluster 150 that have been allocated by the GPU service platform 130 to handle the service request. The GPU API 114 also comprises routines to handle local GPU-related processing such as executing GPU application code, manipulating data, handling errors, etc.

In one embodiment, the GPU API 114 is implemented as an extension to a commercially available GPU API platform such as CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels. In one embodiment of the invention, the GPU APIs 114 comprise "shim" layers of a standard, commercially available API. As is known in the art of computer programming, a shim layer is a library that transparently intercepts API calls and modifies arguments that are passed for a given operation, handles the operation itself, or redirects the operation to another entity. In this regard, the GPU API 114 may comprise shim layers that are utilized to extend the functionality of an existing API (e.g., CUDA) to implement the functionalities of the GPU API 114 as described herein.

While FIG. 1 depicts a generic illustration of the GPU service platform 130 and the GPU server cluster 150, it is to be understood that the GPU service platform 130 can be any type of private or public cloud computing platform. For example, GPU service platform 130 may comprise a single data center or otherwise be implemented within a data center. Alternatively, the constituent components/nodes of the GPU service platform 130 may be distributed over multiple data centers or over multiple locations of a cloud computing platform. In this regard, the GPU server cluster 150 can be located within a single data center, or the GPU server nodes 150-1, 150-2, . . . , 150-s can be remotely distributed over two or more data centers or multiple locations of a cloud computing platform. Furthermore, the GPU server nodes 150-1, 150-2, . . . , 150-s may implement one of many types of commercially available server systems including, but not limited to, a Windows server, a Sun Solaris server, an HP server, a Linux server, etc. The service platform network 160 is configured to enable network communication between the GPU service controller 140 and the GPU server nodes 150-1, 150-2, . . . , 150-s within the server cluster 150. In addition, the service platform network 160 is configured to enable peer-to-peer network communication between the GPU server nodes 150-1, 150-2, . . . , 150-s within the server cluster 150. Depending on the network distribution and geographic location of the constituent components and nodes of the GPU service platform 130, the service platform network 160 may comprise, for example, a LAN, a WAN, or a combination of one or more LANs and WANs, as well as other types of communications networks that are commonly used to implement cloud computing platforms.

The GPU service controller 140 is configured to control various functionalities of the GPU service platform 130. For example, the GPU service controller 140 is configured to receive a service request from the client system 110 for GPU processing services provided by the GPU service platform 130, and then invoke the GPU server allocation and scheduling module 142 to allocate and schedule one or more of the GPU server nodes 150-1, 150-2, . . . , 150-s within the GPU server cluster 150 to handle execution of GPU processing tasks associated with the received service request. The GPU server allocation and scheduling module 142 will allocate either a single GPU server node or multiple GPU server nodes within the cluster of GPU server nodes 150 to handle the service request depending on, e.g., the available GPU devices and processing resources of the GPU server nodes, the nature of the GPU processing tasks associated with the service request, etc.

For example, in one embodiment, the allocation and scheduling of GPU server nodes is determined based, at least in part on, information contained in the database of policies 144 and the database of GPU server registration information 146. Each GPU server node 150-1, 150-2, . . . , 150-s within the GPU server cluster 150 registers with the GPU service controller 140, wherein the GPU server node registration information is maintained in the GPU server registration information database 146. For example, when a given GPU server node is booted, the GPU server node will acquire information regarding all available GPU devices and resources on the given GPU server node. The GPU server node will then register itself and all available GPU devices and resources with the GPU service controller 140, and provide various types of registration information that enables connection to the GPU server node and utilization of the available GPU devices and resources on the given GPU server node.

Furthermore, in one embodiment of the invention, the administrator of the GPU service platform 130 maintains policies with regard to GPU server node allocation. For example, the policies may specify whether to execute GPU processing tasks on local GPU server nodes, on remotely located GPU server nodes, or on a combination of local and remotely located GPU server nodes within the server cluster 150. The administrator will specify one or more policies for each client system and/or each type of GPU application that can be serviced by the GPU service platform 130, so that when a connection is made with the client system 110 for a GPU service request, the GPU server allocation and scheduling module 142 can map and bind the GPU service request to one or more local, cloud based or hybrid collection of GPU server nodes to service the client request, or otherwise determine a proper GPU server node allocation for the given client service request. In all instances, the handling of the GPU service requests from the client systems is local to the data center, while the workload may migrate transparently between resources based on one or more specified policies of the data center administrator.

Furthermore, the allocation and scheduling of GPU server nodes is dynamically determined based on information contained in the service request received from the client system 110. For instance, the client request may specify a number of GPU devices for handling the GPU processing tasks associated with the GPU service request, wherein the allocation of one or more GPU server nodes within the server cluster 150 is determined so that the allocated GPU server nodes comprise a total number of available GPU devices that meet the specified number of GPU devices as requested in the service request. In addition, the client request may specify one or more service attributes associated with the GPU processing tasks associated with the service request. For example, the service attributes can specify a quality of service (QoS) and a priority level for executing the GPU processing tasks, wherein the allocation of one or more GPU server nodes within the server cluster 150 is dynamically determined so that the allocated GPU server nodes will collectively have sufficient processing resources to satisfy the service attributes specified in the GPU service request.

When the client system 110 requires the services of the GPU service platform 130 to execute GPU program code, the GPU API 114 connects to the GPU service platform 130 and transmits a service request to the GPU service controller 140 for GPU server allocation. The GPU service controller 140 invokes the GPU server allocation and scheduling module 142 to dynamically allocate and schedule one or more of the GPU server nodes 150-1, 150-2, . . . , 150-$s$ within the GPU server cluster 150 to handle execution of GPU processing tasks associated with the received service request. Based on information contained within the databases 144 and 146, and information contained in the GPU service request received from the client system 110, the GPU server allocation and scheduling module 142 will have knowledge of all available GPU devices and resources within the GPU server cluster 150, knowledge of all currently mapped client-to-GPU server node connections, as well as knowledge of the required GPU processing resources based on the client service request. Using this knowledge, the GPU server allocation and scheduling module 142 will survey all available (registered) GPU server nodes, resources and currently connected jobs, and then allocate one or more registered GPU server nodes within the server cluster 150 to handle the service request. In doing so, the GPU server allocation and scheduling module 142 can allocate a single GPU server node to handle a small GPU processing task, or logically bind multiple GPU server nodes to handle larger GPU processing tasks. In this regard, the GPU service controller 140 implements, for example, methods for scheduling GPU device and computing resources across multiple GPU server nodes within the server cluster 150, mapping client systems to GPU server nodes within the server cluster 150 based on jobs attributes and available GPU resources, and other functionalities as discussed herein.

For example, the GPU server allocation and scheduling module 142 can allocate a single GPU server node within the server cluster 150 if the single GPU server node has an amount of available GPU devices and resources which is deemed sufficient to handle execution of the GPU processing tasks associated with the service request. When the GPU processing tasks of the service request cannot be handled using the GPU devices and resources of a single GPU server node within the server cluster 150, the GPU server allocation and scheduling module 142 will select two or more GPU server nodes within the server cluster 150 which collectively have an amount of available GPU devices and resources which is sufficient to handle execution of the GPU processing tasks associated with the service request.

For a multiple GPU sever node allocation, the GPU server allocation and scheduling module 142 will communicate with each of the allocated GPU server nodes, commanding the allocated GPU server nodes to logically bind together and establish communication links to conduct peer-to-peer communications and workload processing to execute the GPU processing tasks associated with the client request. The GPU server allocation and scheduling module 142 will select one of the allocated GPU server nodes to be a master node, and designate the other allocated GPU server nodes as slave nodes. The GPU service controller 140 would then return information regarding the master GPU server node to the client system 110 to enable the client system 110 to connect to the master GPU server node and commence execution of the requested GPU processing tasks. When executing the GPU processing tasks, the master GPU server node will coordinate access to all GPU devices and resources across the allocated (logically bound) master and slave GPU server nodes, returning processing results to the client system 110 only through the master GPU server node. In this case, the client system 110 sees a larger logical GPU server node, while the master GPU server node coordinates and manages the execution of the GPU processing tasks across the allocated (and logically bound) GPU server nodes with fine grain control, transparently to the client system 110.

For each GPU server node within the server cluster 150, the associated queue-based GPU virtualization and management system 152 is configured to allow shared access and utilization of the GPU devices 154 of the GPU server node by a plurality of client systems. In addition, the queue-based GPU virtualization and management systems 152 of the GPU server nodes 150-1, 150-2, . . . , 150-$s$ allow multiple client systems to concurrently use the GPU devices 154 of one or more GPU server nodes as if the GPU devices 154 were allocated to the client systems in a dedicated manner.

In general, each queue-based GPU virtualization and management system 152 comprises a task queue service module that is configured to enqueue GPU processing tasks in a task queue. In addition, each queue-based GPU virtualization and management system 152 comprises a task scheduler/dispatcher module that is configured to schedule execution times for GPU processing tasks that are enqueued in the task queue, and to dispatch the GPU processing tasks enqueued in the task queue to a server backend GPU worker process to handle execution of the GPU processing tasks at their scheduled times using the GPU devices 154 of the GPU server node.

In this regard, each queue-based GPU virtualization and management system 152 of a given GPU server node allows different client systems to share the GPU devices 154 of the given GPU server node temporally and/or spatially. For example, in one embodiment, a single GPU device can be shared temporally by different client systems, wherein different GPU processing tasks associated with the different client systems are executed using the same GPU device at different times. In another embodiment, a single GPU device can be shared spatially, wherein different GPU processing tasks of different client system are concurrently executed using the same GPU device, but executed in different sets of cores of the GPU device.

This is in contrast to conventional systems in which, as noted above, individual client systems (or users) are assigned to individual GPU devices on a dedicated basis, which leads to low utilization of GPU devices. In particular, in current GPU service configuration systems, data center managers will allocate individual GPU devices to individual clients/users on a dedicated basis. In most use scenarios, a given client/user does not utilize the assigned GPU device for 100% of the time that the GPU device is allocated to the client/user. Even when a GPU-accelerated application is executing, the control flow will frequently return to a CPU for processing non-GPU related code of the GPU-accelerated application. The GPU utilization is further degraded when a client/user requests more than one GPU but only achieves peak utilization for short durations over the execution of the program.

In this regard, we define a first aspect of GPU utilization as temporal utilization. Assume that a given client system is allocated to a GPU device on a GPU server node. If the client system is not currently executing a GPU-accelerated application, or if the client system is executing a GPU-accelerated application program, but the GPU-accelerated application program is not currently executing GPU-related code in the current application state, the GPU device will be idling and not being utilized by the client system. In a conventional scheme, another client system that needs a GPU resource at the given moment would not be able to access the already allocated GPU device. However, the queue-based GPU virtualization and management system 152 of a given GPU server node would allow two different client systems to have pending tasks in a task queue which are designated for execution using the same GPU device, but at different times.

A second aspect of GPU utilization is spatial utilization. In instances where a given GPU device is executing a compute kernel, but the compute kernel does not fully consume the resources of the GPU device, the queue-based GPU virtualization and management system 152 of a given GPU server node can coordinate the concurrent execution of multiple compute kernels (associated with different client systems) using the same GPU device to more efficiently utilize the internal resource of the given GPU device.

Moreover, as explained in further detail below, in one embodiment of the invention, when two or more GPU server nodes within the server cluster 150 are allocated and logically bound to handle the execution of GPU processing tasks requested by a client system, the queue-based GPU virtualization and management systems 152 of the allocated GPU server nodes are logically bound to establish a single logical queue-based GPU virtualization and management system comprising a single logical task queue, a single logical task queue service module, and a single logical task scheduler/dispatcher module, for example, to collectively handle the GPU processing tasks requested by the client system. The single logical queue-based GPU virtualization and management system that is established by the logical binding of the GPU server nodes is managed by the master GPU server node to control queueing and dispatching of the GPU processing tasks associated with the service request of the client system.

Figure 2:
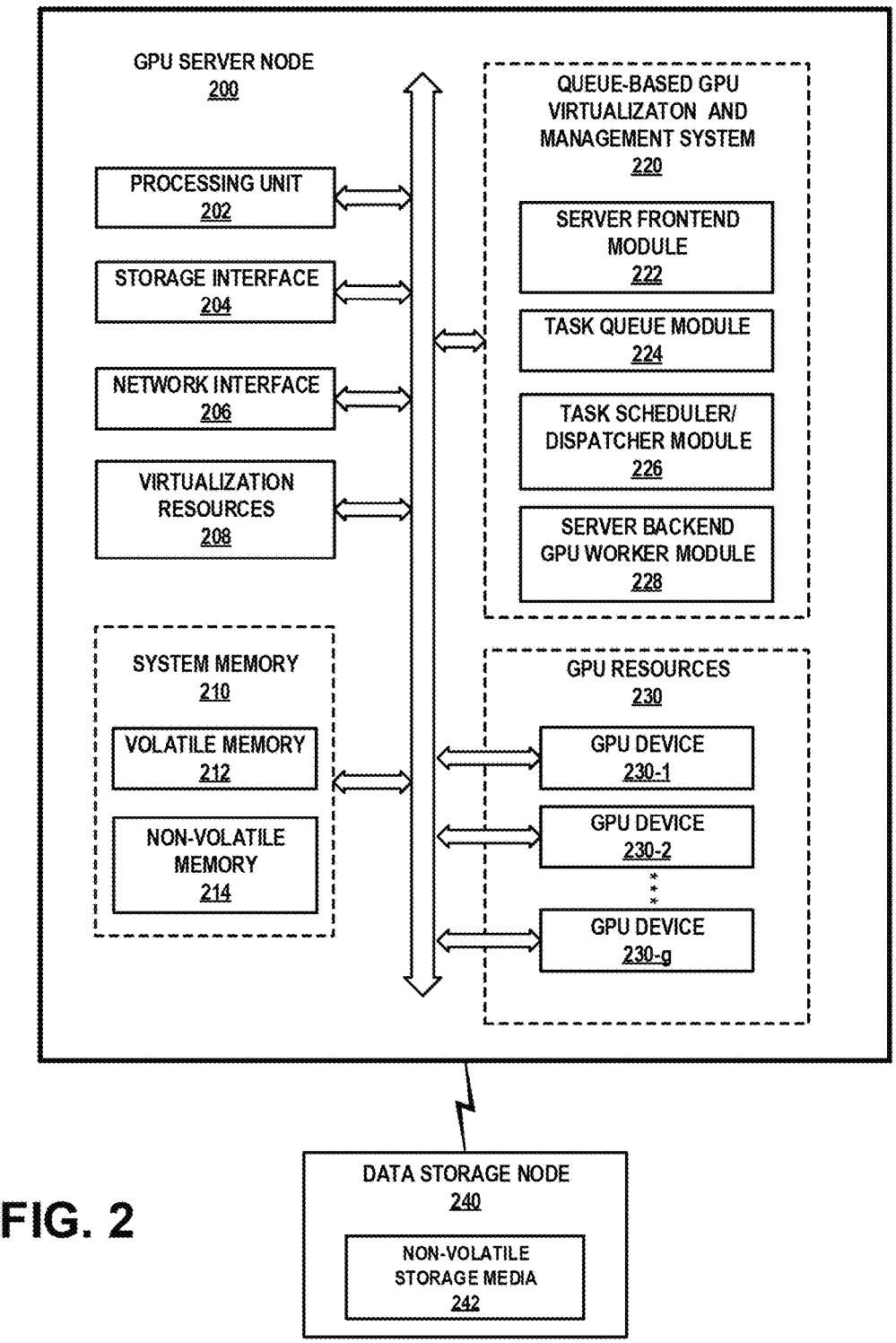
FIG. 2 schematically illustrates an embodiment of a GPU server node of the GPU service platform of FIG. 1, according to an embodiment of the invention.

FIG. 2 schematically illustrates an embodiment of a GPU server node of the GPU service platform of FIG. 1, according to an embodiment of the invention. More specifically, FIG. 2 shows an embodiment of a GPU server node 200 that is configured to support GPUaaS for shared access to GPU resources by multiple client systems, according to an embodiment of the invention. The GPU server node 200 comprises a processing unit 202, storage interface circuitry 204, network interface circuitry 206, virtualization resources 208, system memory 210, a queue-based GPU virtualization and management system 220, and GPU resources 230. The system memory 210 comprises volatile memory 212 and non-volatile memory 214. The GPU resources 230 comprise one or more GPU devices 230-1, 230-2, . . . , 230-g. The queue-based GPU virtualization and management system 220 comprises a server frontend module 222, a task queue module 224, a task scheduler/dispatcher module 226, and a server backend GPU worker module 228.

As further shown in FIG. 2, a data storage node 240 is coupled to the GPU server node 200. The data storage node 240 comprises non-volatile storage media 242 to provide persistent data storage for the GPU server node 200. The non-volatile storage media 242 may include one or more different types of persistent storage devices such as HDDs (hard disk drives) or SSDs (solid-state drives), or other types and combinations of non-volatile memory. In one embodiment, the data storage node 240 is implemented using, for example, an enterprise-class storage platform comprising high performance scalable storage arrays, which can be implemented for hyper-scale computing systems.

In one embodiment, the various system modules 222, 224, 226, and 228 of the queue-based GPU virtualization and management system 220 comprise software modules that are persistently stored in a storage device (e.g., non-volatile storage media 242). The system modules 222, 224, 226, and 228 are loaded into the system memory resources (e.g., volatile memory 212 and/or non-volatile memory 214), and executed by the processing unit 202 to perform various functions as described herein. In this regard, the system memory 210 resources and the non-volatile storage media 242, and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processing unit 202 may comprise one or more processors that are configured to process program instructions and data to execute a native operating system (OS) and applications that run on the GPU server node 200. For example, the processing unit 202 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The storage interface circuitry 204 enables the processing unit 202 to interface and communicate with the system memory 210, the data storage node 240, and other local storage and off-infrastructure storage media on the GPU server node 200 or on the data storage node 240, using one or more standard communication and/or storage control protocols to read data from, or write data to, volatile and non-volatile memory/storage devices. The network interface circuitry 206 enables the GPU server node 200 to interface and communicate with a network and other system components. The network interface circuitry 206 may comprise conventional transceivers of a type well known in the art (e.g., network interface cards, I/O adaptors, etc.).

The virtualization resources 208 can be instantiated to execute one or more applications or functions which are hosted by the GPU server node 200. For example, in one embodiment, the virtualization resources 208 comprise virtual machines that are implemented using a hypervisor platform which executes on the GPU server node 200, wherein one or more virtual machines can be instantiated to execute functions of the GPU server node 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the GPU server node 200, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 208 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the GPU server node 200. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 210 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 202 to execute a native operating system and one or more applications hosted by the GPU server node 200, and to temporarily store data that is utilized and/or generated by the native OS and application programs running on the GPU server node 200. For example, the volatile memory 212 of the system memory 210 may be a dynamic random-access memory (e.g., DRAM) or other forms of volatile RAM. The non-volatile memory 214 may comprise a storage-class memory (SCM) that is accessible as a memory resource. For example, the non-volatile memory 214 may be a NAND Flash storage device, a SSD storage device, or other types of next generation non-volatile memory (NGNVM) devices.

As noted above, the queue-based GPU virtualization and management system 220 is configured to allow multiple users/client systems to share the GPU devices 230-1, 230-2, . . . , 230-g of the GPU server node 200, wherein the sharing is implemented temporally and/or spatially. In addition, the queue-based GPU virtualization and management system 220 is configured to logically bind with the queue-based GPU virtualization and management systems of other GPU server nodes to create a single logical queue-based GPU virtualization and management system which is controlled by a master GPU server node to manage access to a logical pool of GPU devices and resources across the multiple GPU server nodes that are allocated and logically bound for executing GPU processing tasks requested by a given client system.

In general, the server frontend module 222 implements functions to receive and process incoming requests, control messages, program code, etc., received from the GPU service controller 140 (FIG. 1) and from the GPU API 114 of the client system 110 (FIG. 1). The server frontend module 222 implements standard interfaces and functions to enable client/server communication between the client system 110 and the GPU server system 200. In addition, the server frontend module 222 comprises methods to pass incoming service requests for GPU services from the client system 110 to the task queue module 224.

The task queue module 224 comprises functions for implementing and managing a task queue, generating tasks (e.g., execution units) based on service requests received from client systems, and enqueuing the tasks on the task queue. The different tasks that are enqueued in the task queue correspond to different blocks of GPU program code of GPU-accelerated applications executing on the client system 110, which are sent to the GPU server node 200 for remote processing using the GPU resources 230. The task scheduler/dispatcher module 226 implements functions for assigning GPU devices to client systems, scheduling execution times for tasks that are placed on the task queue, and dispatching tasks to server backend GPU workers, which are implemented by the server backend GPU worker module 228, to handle execution of the tasks at the scheduled times using the assigned GPU devices. The server backend GPU worker module 228 implements functions to return GPU processing results of tasks to the requesting client system. The various modules 222, 224, 226, and 228 of the queue-based GPU virtualization and management system 220 collectively operate to provide fine-grained sharing of the GPU resources 230 among multiple client systems, both temporally and spatially, using various techniques as discussed herein.

FIG. 3 schematically illustrates a run-time implementation of a client system and a GPU service platform, according to an embodiment of the invention. For purposes of illustration, FIG. 3 depicts a run-time implementation of the GPU service platform 130 of FIG. 1 having GPU server nodes that are based on the server node framework shown in FIG. 2. Referring to FIG. 3, a client system 310 hosts and executes a GPU-accelerated application process 312. The client system 310 comprises a processor 316 (e.g., a CPU) which receives and executes sequential CPU code portions of the GPU-accelerated application process 312. The GPU-accelerated application process 312 passes GPU-related code (e.g., GPU compute functions, kernels, etc.) to a run-time implementation of a GPU API 314. The run-time implementation of the GPU API 314 comprises routines that are configured for local processing of certain GPU code, e.g., manipulating data, error handling, etc. In addition, the run-time implementation of the GPU API 314 is configured to transmit a GPU service request to the GPU service controller 140 to request GPU processing services for executing compute-intensive code portions of the GPU-accelerated application process 312 which are encountered during execution of the GPU-accelerated application process 312 on the client system 310.

The exemplary run-time implementation of the GPU service platform 130 shown in FIG. 3 illustrates an example allocation in which two GPU server nodes 200-1 and 200-2 have been allocated by the GPU server allocation and scheduling module 142 of the GPU service controller 140 to handle the execution of GPU processing tasks associated with the GPU service request transmitted to the GPU service controller 140 from the GPU API 314. The GPU server nodes 200-1 and 200-2 in FIG. 3 depict run-time implementations of the GPU server node 200 of FIG. 2. As shown in FIG. 3, the GPU server node 200-1 is designated as a master GPU server node for directly communicating with the client system 310, and the GPU server node 200-2 is designated as a slave GPU server node which is logically bound with the master GPU server node 200-1.

In addition, FIG. 3 illustrates run-time implementations of queue-based GPU virtualization and management systems 320-1 and 320-2 running on the GPU server nodes 200-1 and 200-2, respectively and, in particular, a logical binding of the run-time implementations of queue-based GPU virtualization and management systems 320-1 and 320-2 of the GPU server nodes 200-1 and 200-2. The logical binding of the GPU server nodes 200-1 and 200-2 and the respective queue-based GPU virtualization and management systems 320-1 and 320-2 is performed in response to control messages communicated between the GPU server allocation and scheduling module 142 and the GPU server nodes 200-1 and 200-2.

Furthermore, in the example embodiment of FIG. 3, the client system 310 is network connected to the master GPU server node 200-1 wherein the GPU API 314 directly communicates with the master GPU server node 200-1 and, in particular, with a single logical queue-based GPU virtualization and management system that is formed by logically binding and combining the constituent components (e.g., 322, 324, 326 and 328) of the two queue-based GPU virtualization and management systems 320-1 and 320-2. The GPU API 314 directly communicates with the master GPU server node 200-1 through the server frontend 322 on the master GPU server node 200-1, and the GPU server nodes 200-1 and 200-2 communicate with each other through the logically combined server frontend 322, for example.

The GPU API 314 is configured to transmit blocks of GPU program code and associated data to the master GPU server node 200-1, which are executed using a pool of GPU devices (the combination of the GPU devices 230-1, 230-2, ... 230-g on the GPU server nodes 200-1 and 200-2) under control of the single logical queue-based GPU virtualization and management system (combined systems 320-1 and 320-2), which is managed by the elected master GPU server node 200-1 to control queueing and dispatching of the GPU processing tasks associated with the service request of the client system.

In particular, as shown in FIG. 3, the run-time implementation of each queue-based GPU virtualization and management system 320-1 and 320-2 comprises a server frontend 322, a task queue service 324, a task scheduler/dispatcher 326, and server backend GPU workers 328. The server frontend 322 and task queue service 324 represent running instances of the server frontend module 222 and the task queue module 224, respectively, shown in FIG. 2. In addition, the task scheduler/dispatcher 326 and the server backend GPU workers 328 represent running instances of the task scheduler/dispatcher module 226 and the server backend GPU worker module 228, respectively, shown in FIG. 2. During run-time, the server frontend 322 implements methods to handle requests that are received from the GPU API 314 of the client system 310. For example, the server frontend 322 comprises methods to process client credentials, perform authentication, and perform other types of functions to authenticate a user of the client system 310 and establish a communications session with the client system 310. For GPU service requests that require the processing of GPU code (e.g., compute kernels) passed from the GPU API 314, the server frontend 322 passes the service requests to the task queue service 324.

The task queue service 324 processes the incoming GPU service requests by inserting one or more tasks associated with GPU service request into a task queue, wherein the queued tasks can be asynchronously pushed to one or more server backend GPU workers 328 for execution at a scheduled time. The runtime task scheduler/dispatcher 326 implements methods for scheduling tasks, which are enqueued in the task queue, for execution by one or more server backend GPU workers 328 using one or more of the GPU devices 230-1, 230-2, . . . , 230-g of the GPU server nodes 200-1 and 200-2, which are assigned to handle the tasks. The task scheduler/dispatcher 326 monitors the task queue and utilizes one or more scheduling protocols to determine which tasks should be consumed by the server backend GPU workers 328 at certain times. In one embodiment, the runtime task scheduler/dispatcher 326 utilizes scheduling protocols that take into consideration one or more factors such as task priority, memory location, GPU availability, fairness among all client systems, etc. In one embodiment, the task scheduler/dispatcher 326 comprises a pluggable software component which allows service administrators to select a scheduling protocol which meets their needs and, thereby enabling the input of administrative constraints to govern user consumption and job execution using the GPU resources 230 of the GPU server nodes 200-1 and 200-2.

In addition, the runtime task scheduler/dispatcher 326 implements methods to dispatch or otherwise distribute tasks within the task queue among the server backend GPU workers 328 according to the determined schedules for task execution. In one embodiment, the runtime task scheduler/dispatcher 326 pushes queued tasks to the server backend GPU workers 328. The server backend GPU workers 328 execute the dispatched tasks using one or more GPU devices 230-1, 230-2, . . . , 230-g of the GPU server nodes 200-1 and 200-2, which are assigned/designated by the runtime task scheduler/dispatcher 326 for executing the dispatched tasks at the scheduled times. In this regard, the task queue service 324, which stores and manages tasks that correspond to GPU service requests from multiple client systems, enables fine-grained sharing of GPU resources among the multiple client systems.

In particular, in one embodiment of the invention, the task queue service 324 enables temporal sharing of the GPU devices by multiple client systems. For example, as noted above, two different client systems can have pending tasks in the task queue which are designated for execution using the same GPU device, but at different times. In this regard, when a first client system is idling (e.g., the user is not executing the GPU-accelerated application, or the GPU-accelerated application is not utilizing the GPU device at a given time), the GPU device can be utilized by a second client system.

Furthermore, in another embodiment of the invention, the task queue service 324 enables spatial sharing of the GPU resources by multiple client systems. For example, spatial sharing of a given GPU by two different client systems allows pending tasks of the different client systems to be concurrently executed using the same GPU device, but using different portions (e.g., different sets of cores) of the GPU device. Therefore, when a given GPU device is allocated to a first client system, and the first client system cannot fully utilize the given GPU device, then the same GPU device can be allocated to a second client system to allow the second client system to utilize another portion (e.g., set of cores) of the given GPU device at the same time.

The example embodiment of FIG. 3 schematically illustrates that the queue-based GPU virtualization and management systems 320-1 and 320-2 executing on different GPU server nodes 200-1 and 200-2 can bind together logically, presenting a single interface to the client system 310, while maintaining a single task queue interface for handling incoming GPU processing tasks from the client system 310. The ability to establish a single task queue interface for the client system 310 in a GPUaaS model enables many different GPU server nodes to be logically combined transparently to the client system 310, whereby the client interface to the GPU service platform 130 remains the same irrespective of what GPU server nodes, or how many GPU server nodes, are allocated to handle GPU processing tasks requested by the client system 310. The client interface does not change as the number of client systems and GPU processing tasks supported by the GPU service platform 130 are scaled.

Figure 4A:
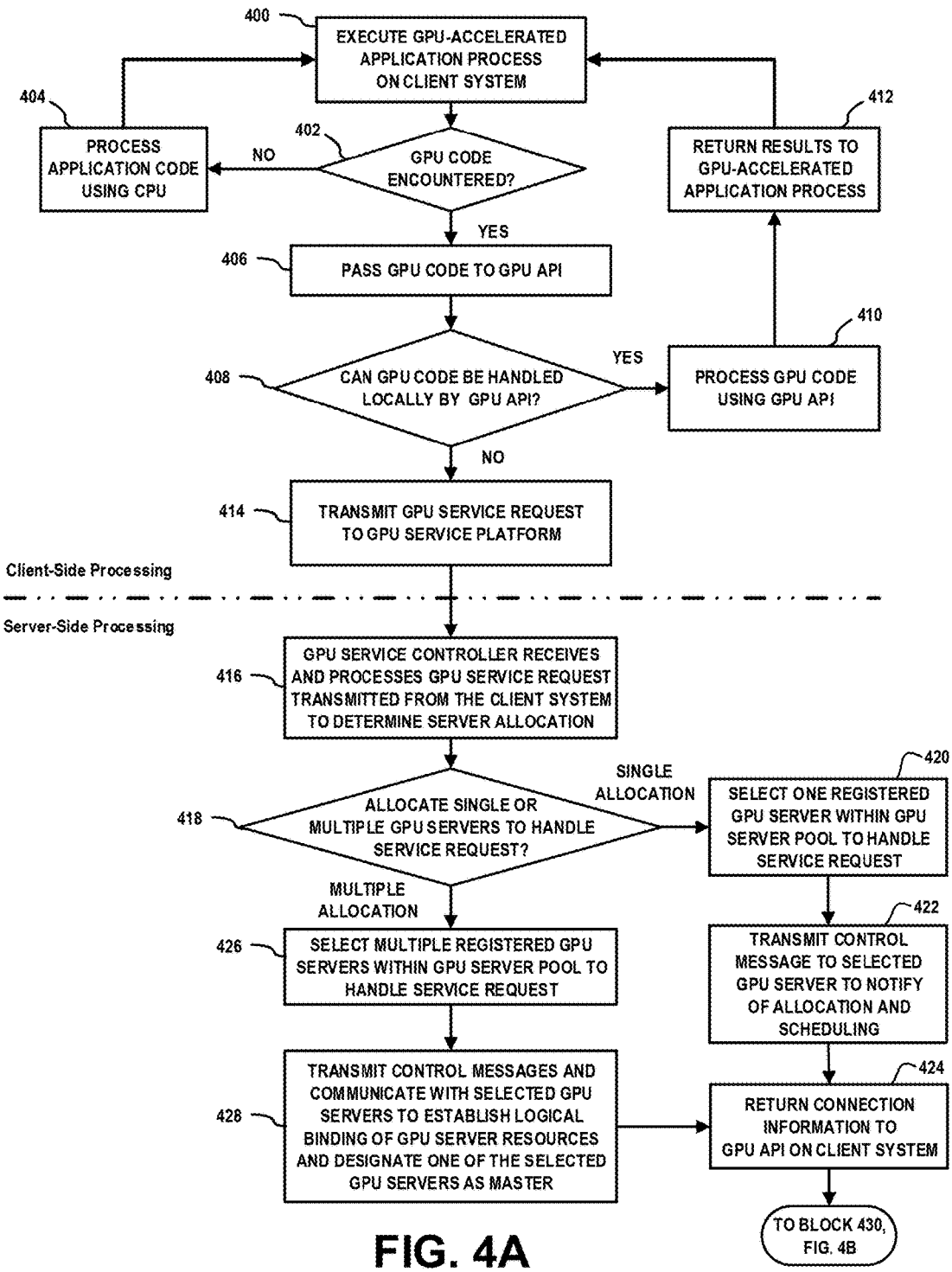
FIGS. 4A and 4B illustrate a flow diagram of a method for managing access to a resource pool of GPU devices under fine grain control, according to an embodiment of the invention.
Figure 4B:
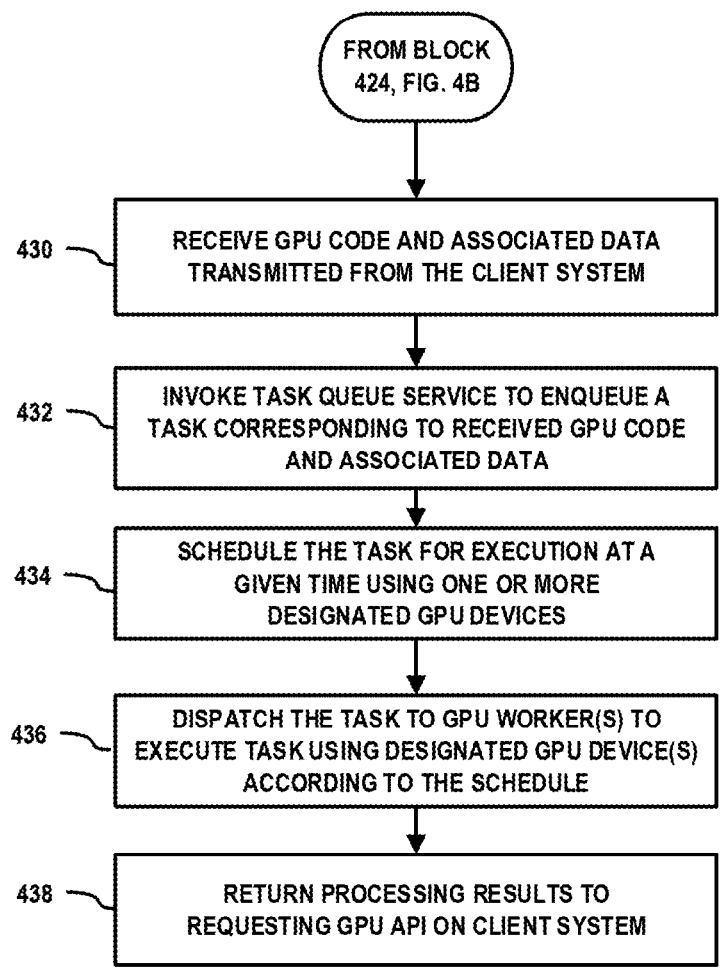

FIGS. 4A and 4B illustrate a flow diagram of a method for managing access to a resource pool of GPU devices under fine grain control, according to an embodiment of the invention. For illustrative purposes, the method of FIGS. 4A and 4B will be discussed in the context of the exemplary run-time system 300 shown in FIG. 3. Referring to FIG. 4A, a user will launch a GPU-accelerated application on the client system 310 (block 400). While the GPU-accelerated application process 312 is executing on the client system 310, a determination is continually made as to whether a current block of program code to be executed comprises GPU-related code (determination in block 402). If the current block of program code is not GPU-related code (negative determination in block 402), the GPU-accelerated application process 312 passes the block of program code to the local processor 316 (e.g., CPU) to execute the current block of program code (block 404).

On the other hand, if the current block of program code is GPU-related code (affirmative determination in block 402), the GPU-accelerated application process 312 passes the GPU-related code to the GPU API 314 (block 406). The GPU API 314 determines whether the GPU code can be handled locally by the GPU API 314 (block 408). For example, for static requests (e.g., error checking) that do not need GPU resources 230 of the GPU server node 200, the GPU API 314 can locally process such request and return results to the GPU-accelerated application process 312, thereby reducing communication overhead. In this regard, if it is determined that the GPU API 314 can locally process the current block of GPU-related code (affirmative determination in block 408), the GPU API 314 will process the current block of GPU-related code (block 410) and then return the processing results to the GPU-accelerated application process (block 412). On the other hand, if it is determined that the GPU API 314 cannot locally process the current block of GPU-related code (negative determination in block 408), the GPU API 314 will generate and transmit a GPU service request to the GPU service platform (block 414).

More specifically, in one embodiment of the invention, the GPU API 314 will transmit the GPU service request to the GPU server controller 140. In one embodiment, the GPU service request comprises a client request for GPU server allocation which is processed by the GPU server allocation and scheduling module 142. The client request for GPU server allocation will include associated information such as, e.g., an identifier of the client system 310 and/or GPU-accelerated application requesting the GPU service, the GPU processing task(s) to be executed, priority level information, quality of service (QoS) information, preferred GPU server capabilities, and a requested number of GPU devices and/or processing resources (e.g., GPUs, virtual central processing units (vCPUs), etc.) for handling server-side execution of GPU-accelerated application program code, and/or other types of relevant information that can utilized by GPU service platform 130 to allocate GPU resources to support GPUaaS.

Next, on the GPU server-side, the GPU service controller 140 receives and processes the GPU service request transmitted from the GPU API 314 of the client system 310 to determine a GPU server allocation for handling the GPU service request (block 416). More specifically, in one embodiment of the invention, the GPU server allocation and scheduling module 142 receives and processes the GPU service request and associated information to determine one or more GPU server nodes within the GPU server cluster which can be allocated to handle the GPU processing task(s) associated with the GPU service request. The GPU server allocation and scheduling module 142 allocates one or more GPU server nodes and schedules the task(s) for execution using additional information contained in the database of policies 144 and/or the database of GPU server registration information 146.

In particular, the GPU server allocation and scheduling module 142 will access the database of GPU server registration information 146 to determine all available GPU resources and GPU sever nodes within the current GPU resource pool of the GPU service platform 130, and determine all pending jobs that are currently scheduled for execution (or which are being executed) by the GPU server nodes. Then, based on the available GPU server nodes and GPU resources, and based on the nature of the GPU processing task(s) requested by the client system, and allocation requests (e.g., number of GPU devices) specified by the client system in the GPU service request, the GPU server allocation and scheduling module 142 will determine the amount of resources (e.g., GPU devices) which are needed to handle the GPU processing task(s), and proceed to allocate one or more available GPU server nodes to handle the GPU processing task(s) requested by the client system.

In addition, the GPU server and resource allocation can be determined, at least in part, on one or more policies that are associated with the given GPU service request and/or client system 310. As noted above, an administrator of the GPU service platform 130 can provide a policy per user/application so when a service connection is made, the GPU service controller 140 can map the service request to one or more GPU server nodes, and logically bind a local, cloud based or hybrid collection of GPU resources to service the request, depending on the policies associated with the given GPU service request and/or client system 310. While the handling of the GPU service request from the client system may be local to the GPU service platform 130 (e.g., data center), the GPU processing of the associated tasks may migrate transparently between local and remote GPU resources to meet a specified policy.

Based on the various types of information as discussed above, the GPU server allocation and scheduling module 142 will determine whether to allocate a single GPU server or multiple GPU server nodes within the resource pool of GPU server nodes to handle the current GPU service request (determination in block 418). In this allocation determination process, the GPU server allocation and scheduling module 142 can allocate a single registered GPU server (either local or remote to the GPU service platform 130) to handle the GPU processing task(s) associated with current GPU service request, if a single registered GPU with sufficient GPU processing resources is available to execute the GPU processing task(s). Alternatively, the GPU server allocation and scheduling module 142 can allocate two or more registered GPU server nodes (local, remote, or local and remote to the GPU service platform 130) to handle the GPU processing task(s) associated with current GPU service request, if a single registered GPU with sufficient GPU processing resources is not available to execute the GPU processing task(s). Again, in addition to the GPU resource availability within the GPU server pool, the allocation of a single GPU server node or multiple GPU server nodes to handle the GPU processing task(s) can be determined based on other factors, such as a level of priority associated with the task(s), QoS criteria, and/or other attributes associated with the GPU processing task(s) to be executed.

If a single GPU server node allocation is determined (in block 418) to be sufficient to handle the GPU processing task(s) associated with the GPU service request, the GPU server allocation and scheduling module 142 will select a single registered GPU server node within the pool of GPU server nodes which has available GPU resources to handle the GPU processing task(s) (block 420). The GPU service controller 140 transmits a control message to the selected GPU server node (block 422). The control message serves to notify the selected GPU server node that it has been allocated to handle the GPU processing task(s) associated with the GPU service request, and to provide relevant scheduling information (e.g., priority information, task attributes, QoS information, etc.) which is utilized by the selected GPU server node to schedule execution of the GPU processing task(s). In addition, the GPU service controller 140 will return a response message to the GPU API 314 of the client system 310, wherein the response message comprises connection information to enable the GPU API 314 to connect to the selected GPU server node that is allocated to handle the GPU processing task(s) associated with the GPU service request (block 424).

On the other hand, if it is determined (in block 418) that a multiple GPU server node allocation is needed to handle the GPU processing task(s) associated with the GPU service request, the GPU server allocation and scheduling module 142 will select multiple registered GPU server nodes within the pool of GPU server nodes which are determined to collectively have the available GPU resources needed to handle the GPU processing task(s) (block 426). The GPU service controller 140 will transmit a control message to each of the selected GPU server nodes (block 428). The control messages serve to (i) notify the selected GPU server nodes that they have been allocated to handle the GPU processing task(s) associated with the GPU service request, and (ii) command the selected GPU server nodes to logically bind together for peer-to-peer communication and align their GPU resources for handling the GPU processing task(s). In addition, the control messages specify which GPU server is elected as the master GPU server node for connecting with the client system 310, and which GPU server nodes are elected as slave GPU server nodes. In addition, the control messages provide relevant scheduling information (e.g., priority information, task attributes, QoS information, etc.) which is utilized by the elected master GPU server node to schedule execution of the GPU processing task(s) associated the GPU service request of the client system.

For example, as noted above, the run-time embodiment shown in FIG. 3 illustrates an example embodiment in which two GPU server nodes 200-1 and 200-2 are allocated by the GPU server allocation and scheduling module 142 to handle GPU processing tasks associated with a GPU service request, wherein the GPU server 200-1 is elected as a master, and wherein the GPU server 200-2 is elected as a slave. In addition, FIG. 3 shows an example embodiment in which logical binding occurs between the queue-based GPU virtualization and management systems 320-1 and 320-2 of the respective GPU server nodes 200-1 and 200-2 so that the GPU devices 230-1, 230-2, . . . , 230-g that are located on the allocated GPU server nodes 200-1 and 200-2 can be collectively utilized to execute the GPU processing tasks.

The master GPU server 200-1 will notify the GPU service controller 140 when the logical binding is complete and that peer-to-peer communication is enabled between the selected group of GPU server nodes so that the selected group of GPU server nodes can begin executing the GPU processing task(s). When the logical binding is complete, the GPU service controller 140 will return a response message to the GPU API 314 of the client system 310, wherein the response message comprises connection information to enable the GPU API 314 to connect to the elected master GPU server node to commence execution of the GPU processing task(s) associated with the GPU service request (block 424).

When the GPU API 314 of the client system 310 receives the connection information for a given GPU server node from the GPU service controller 140, the GPU API 314 will proceed to establish a network connection to the given GPU server node, and then transmit one or more blocks of GPU code (e.g., GPU processing task(s) to be executed by the GPU service platform 130, as well as any data which is associated with the block(s) of GPU code and locally stored or otherwise accessed by the client system 310. As noted above, the GPU server node that the client system 310 connects to will be either a single GPU server node which is allocated to handle execution of the GPU code and associated data locally on the single GPU server node, or a master GPU server node (e.g., the master GPU server node 200-1, FIG. 3) which is logically bound to one or more slave GPU server nodes (e.g., slave GPU server node 200-2, FIG. 3) to form a pool of GPU server nodes that are logically configured to collectively handle execution of the GPU code and associated data across the allocated pool of GPU server nodes.

Next, referring to FIG. 4B, on the GPU server-side, the server frontend 322 of the GPU server 200-1 receives the blocks of GPU code and associated data transmitted from the client system 310, which is associated with the GPU service request initially transmitted to the GPU service controller 140 (block 430). The server frontend 322 tags the received GPU code with a timestamp which indicates a time that the initial GPU service request was submitted to the GPU service platform 130.

The next sequence of processing steps (blocks 432, 434, and 436) discuss methods that are performed by the task queue service 324, the task scheduler/dispatcher 326, and the server backend GPU workers 328. It is to be understood that for a single GPU server allocation, the terms "task queue service 324", "task scheduler/dispatcher 326", and "server backend GPU workers 328" (as discussed in connection with blocks 432, 434, and 436) are meant to refer to the local modules of a queue-based GPU virtualization and management system of the single GPU server (e.g., the local modules 324, 326, and 328 of the queue-based GPU virtualization and management system 320-1 of the GPU server 200-1, FIG. 3). On the other hand, for a multiple GPU server allocation, the terms "task queue service 324", "task sched-uler/dispatcher 326", and "server backend GPU workers 328" (as discussed in connection with blocks 432, 434, and 436) are meant to refer to the logically combined modules 324, 326, and 328 of the queue-based GPU virtualization and management systems of two or more logically combined GPU server nodes (e.g., the logical binding of the respective local modules 324, 326, and 326 of the queue-based GPU virtualization and management systems 320-1 and 320-2 of the GPU server nodes 200-1 and 200-2, FIG. 3).

Referring again to FIG. 4B, the server frontend 322 sends the GPU code and associated data to the task queue service 324, which invokes the task queue service 324 to generate one or more tasks based on the GPU code and associated data, and insert the one or more tasks into the task queue (block 432). The task scheduler/dispatcher 326 monitors the task queue and determines when new tasks have been inserted into the task queue. The task scheduler/dispatcher 326 schedules the new tasks that have been placed into the task queue by scheduling a time for executing the new tasks and designating one or more GPU devices (of one or multiple GPU server nodes) for processing the GPU code associated with the new tasks (block 434). When a new task is placed into the task queue, the task scheduler/dispatcher 326 may dynamically adjust the schedules for executing other tasks depending on the scheduling protocol implemented, e.g., to accommodate for priority levels of tasks or dedicated start times of tasks that must be commenced at user-requested start times, etc.

The efficiency of a parallel processing computing system depends on how tightly packed pending tasks can be scheduled so as to maximize system utilization while minimizing wait times. The manner in which tasks are scheduled will depend on the scheduling protocol or queuing model that is implemented by the task scheduler/dispatcher 326. The type of scheduling protocol or queuing model that is implemented will vary depending on the parallel processing environment that is supported by the GPU server nodes. For example, there may be instances in which the GPU server nodes provide support for (i) GPU-accelerated applications that are not time or deadline critical and/or (ii) GPU-accelerated applications that require rigid and fixed time slots to execute tasks for real-time applications. In this regard, the task scheduler/dispatcher 326 should be capable of efficiently scheduling homogenous and/or heterogeneous workloads using suitable scheduling protocols that maximize system utilization while minimizing job wait times.

When the scheduled time for a given task execution arrives, the task scheduler/dispatcher 326 will dispatch the given task to the server backend GPU workers 328 to handle execution of the dispatched task using the designated GPU devices according to the task schedule (block 436). With this process, different tasks in the task queue, which are associated with different GPU service requests from different client systems, can be executed utilizing the same designated GPU device, through temporal utilization or spatial utilization of the GPU device, as discussed above.

The processing results, which are associated with the GPU service request, are then returned to the requesting GPU API 314 on the client system 310 from the GPU server node (e.g., a single allocated GPU server node, or a master GPU server node of a multiple GPU server allocation) to which the client system 310 is connected (block 438). The GPU API 314 passes the processing results to the GPU-accelerated application process 312. In this regard, a GPU virtualization scheme is implemented in which the GPU-accelerated application process 312 is unaware of the background GPU processing that is performed (by the GPU service platform 130) on the GPU-related code portions of the GPU-accelerated application process 312. The GPU-accelerated application process 312 simply passes GPU-related code (and associated data) to the GPU API 314, and receives GPU processing results associated with GPU-related code from the GPU API 314.

The queue-based GPU virtualization techniques implemented by the GPU server nodes according to embodiments of the invention optimize GPU utilization by allowing fine grained sharing of GPU devices on one or more GPU server nodes by multiple client systems. The use of task queues and intelligent task scheduling protocols for executing the tasks in the task queue, allows the GPU resources to be concurrently utilized and shared by multiple client system in an efficient and fair way, while optimizing GPU device and resource utilization.

In another embodiment of the invention, QoS control is enabled by monitoring pending tasks in the task queue. As noted above, the server frontend 322 tags each incoming GPU service request with a timestamp which indicates the time that the GPU service request was submitted to the GPU server. Since the task scheduler/dispatcher 326 knows the time that the GPU service requests are received, and the identity of the client systems associated with the received GPU service requests, the task scheduler/dispatcher 326 can guarantee fair utilization of the GPU resources by all requesting client systems. Moreover, if some tasks in the task queue are pending too long before starting, it can be determined that the GPU server is not capable of handling the workload at that time and some scaling action can be performed either by the administrator or by the server directly to, e.g., increase the amount of GPU resources allocated to the GPU server.

One of ordinary skill in the art can readily envision various use cases for implementing GPUaaS using queue-based GPU virtualization techniques implemented by GPU server nodes, according to embodiments of the invention. For example, assume there is a research institute where an average of ten researchers use GPU devices on a regular basis. With conventional methods, a team manager would have to purchase at least one GPU device for each researcher to allow the researchers to perform daily work. If a given researcher needed to utilize two GPU devices to perform a given task, the task could not be executed as the given researcher would not be able to access another GPU device allocated to another user. However, by utilizing the queue-based GPU virtualization and management techniques described herein, less than ten GPU devices (e.g., four GPU devices) could be shared among the ten researchers to handle most of the daily requirements of the researchers without any significant degradation in GPU processing performance. With the queue-based GPU virtualization techniques discussed herein, the GPU server can readily process a scaling request from a given user requiring two or more GPU devices by utilizing other installed GPU devices. The queue-based GPU virtualization techniques also allow developers to test their code on a variety of different types of GPU devices, as well as utilizing multiple GPU devices, without changing their local host configuration. For example, scaling of GPU device utilization could be performed in a data center under the guidance of the IT administrator with the developer simply changing a subscription to the service.

Another example use case involves a product environment. Assume that multiple services are hosted in a public or private cloud system and that each service requires GPU processing resources. Moreover, assume that some of the services may need to handle bursts of incoming requests that are to be processed using multiple GPU devices. In conventional configurations, the necessary number of GPU devices would need to be pre-allocated to each service to handle the anticipated bursts of incoming requests. For example, if a data center hosted ten services, where each service would possibly need four GPU devices to process incoming bursts of requests, the data center would have to implement 40 GPU devices (i.e., allocate 4 GPU devices to each service). However, considering that the possibility of such bursts of requests arriving for more than two services at a given time is very low, then it can be determined that less than 40 GPU devices (e.g., eight GPU devices) would be enough to handle such anticipated bursts in requests using the queue-based GPU virtualization and management techniques described herein.

In another example use case for a research institute, assume that a first developer has been working on an application, and testing the application scaling as the application approaches production readiness. Assume further that a given data center comprises multiple GPU server nodes, wherein each GPU server comprises two GPU devices, and wherein the GPU server nodes are configured (using techniques discussed herein) to provide GPUaaS for a plurality of developers, and wherein the GPU server nodes have registered their respective GPU resources with a GPU service controller. The first developer now needs to scale his/her application from running on two GPU devices to four GPU devices, and issues a GPU service request for GPU processing using 4 GPU devices. The GPU service controller will survey the mapped client-to-GPU server connections as well as the registered GPU resources to identify two GPU server nodes which can be logically binded to handle the GPU service request for 4 GPU devices. The GPU service controller sends a message to the two GPU server nodes regarding the GPU service request for four GPU devices, commanding that the two GPU server nodes bind together logically to handle the GPU process request, and notifying which GPU server node is elected as the master node. When the binding is complete, the GPU service controller communicates the master GPU server node information to the client, and the client proceeds to execute the GPU processing task as if all GPU resources are on a single node, with the master GPU server managing the task queue and fine grain QoS across the local and remote GPU server nodes.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
 receiving, by a graphics processing unit (GPU) service platform, a service request from a GPU application programming interface (API) executing on a client system for GPU processing services provided by the GPU service platform, wherein the service request comprises a GPU API call of an application executing on a processor of the client system which is intercepted by the GPU API and re-directed to the GPU service platform for execution of the GPU API call by the GPU service platform in a manner that is transparent to the application, wherein the GPU service platform comprises a server cluster of GPU server nodes, wherein each GPU server node within the server cluster comprises (i) one or more GPU devices and (ii) a task scheduling system configured to schedule and dispatch GPU processing tasks to the one or more GPU devices of the GPU server node;

allocating, by a server allocation and scheduling system of the GPU service platform, at least two GPU server nodes within the cluster of GPU server nodes to handle GPU processing tasks specified by the service request, wherein allocating comprises the server allocation and scheduling system sending control messages to the allocated GPU server nodes, wherein the control messages are configured to (i) provide notification that the allocated GPU server nodes have been selected to handle the GPU processing tasks specified by the service request, (ii) specify which GPU server node among the allocated GPU server nodes is designated as a master GPU server node for controlling execution of the GPU processing tasks, and which GPU server nodes among the allocated GPU server nodes are designated as slave GPU server nodes, and (iii) command the allocated GPU server nodes to logically bind together and logically bind their task scheduling systems to establish a single logical task scheduling system which is controlled by the master GPU server node;

sending, by the server allocation and scheduling system of the GPU service platform, connection information to the GPU API executing on the client system to enable the GPU API to establish a network connection to the master GPU server node designated by the server allocation and scheduling system;

receiving, by the master GPU server node, a block of GPU program code of the application executing on the processor of the client system, which is transmitted from the GPU API executing on the client system over the network connection, wherein the block of GPU program code is associated with the GPU processing tasks specified by the service request;

processing the block of GPU program code using the GPU devices of the logically bound master and slave GPU server nodes under the control of the master GPU server node, wherein the master GPU server node utilizes the single logical task scheduling system to schedule and coordinate execution of the GPU processing tasks specified by the service request across the GPU devices of the logically bound master and slave GPU server nodes; and returning, by the master GPU server node, processing results of the block of GPU program code to the GPU API executing on the client system to enable the GPU API to pass the processing results to the application executing on the processor of the client system.

2. The method of claim 1, wherein the allocated GPU server nodes logically bind together to establish peer-to-peer communication links.

3. The method of claim 1, wherein the service request specifies a number of GPU devices for handling the processing tasks specified by the service request, and wherein allocating comprises determining at least two GPU server nodes within the cluster of GPU server nodes having a combined number of available GPU devices that meet the specified number of GPU devices in the service request.

4. The method of claim 1, wherein the service request specifies one or more attributes associated with the GPU processing tasks specified by the service request, wherein the one or more attributes specify at least one of a quality of service (QoS) and a priority level for executing the GPU processing tasks, and wherein allocating comprises determining at least two GPU server nodes within the cluster of GPU server nodes having sufficient processing resources to satisfy the specified one or more attributes.

5. The method of claim 1, wherein processing the block of GPU program code using the GPU devices of the logically bound master and slave GPU server nodes comprises coordinating, by the master server node, access to the GPU devices across the logically bound master and slave GPU server nodes.

6. The method of claim 1, wherein allocating further comprises:
accessing a database of GPU server registration information which comprises registration information for each GPU server node within the server cluster which is registered with the GPU service platform, wherein the registration information for a given GPU server node specifies a number of available GPU devices residing on the given GPU server node; and
selecting two or more registered GPU server nodes which collectively comprise a total number of available GPU devices which is sufficient to handle the service request.

7. The method of claim 1, wherein allocating further comprises:
accessing a database of policies maintained by the GPU service platform, wherein the policies are associated with different client systems or GPU processing tasks, wherein the policies specify GPU server nodes within the server cluster which can be allocated for handling service requests associated with the different client systems or GPU processing tasks based on locations of the GPU server nodes; and
selecting two or more GPU server nodes which reside in locations that correspond to a policy in the database of policies, which is associated with the client system or the GPU processing tasks specified by the service request received from the client system.

8. The method of claim 1, wherein the task scheduling system of each GPU server node within the server cluster comprises (i) a task queue service module that is configured to enqueue GPU processing tasks in a task queue, and (ii) a task scheduler/dispatcher module configured to schedule execution times for GPU processing tasks that are enqueued in the task queue, and to dispatch the GPU processing tasks enqueued in the task queue to a server backend GPU worker process to handle execution of the GPU processing tasks at their scheduled times using the GPU devices of the GPU server node; and
wherein logically binding the allocated GPU server nodes comprises logically binding the task scheduling systems of the logically bound master and slave GPU server nodes to logically establish a single task queue, a single task queue service module, and a single task scheduler/dispatcher module, which are managed by the master GPU server node to control queueing and dispatching of the GPU processing tasks associated with the service request of the client system, and to control the processing of the block of GPU program code using the GPU devices of the logically bound master and slave GPU server nodes.

9. The method of claim 1, wherein the cluster of GPU server nodes resides within a single data center.

10. The method of claim 1, wherein the cluster of GPU server nodes is distributed over a plurality of different data centers or computing platforms.

11. An article of manufacture comprising a non-transitory processor-readable storage medium having stored therein program code of one or more software programs, wherein the program code is executable by one or more processors to implement a process comprising:

receiving, by a graphics processing unit (GPU) service platform, a service request from a GPU application programming interface (API) executing on a client system for GPU processing services provided by the GPU service platform, wherein the service request comprises a GPU API call of an application executing on a processor of the client system which is intercepted by the GPU API and re-directed to the GPU service platform for execution of the GPU API call by the GPU service platform in a manner that is transparent to the application, wherein the GPU service platform comprises a server cluster of GPU server nodes, wherein each GPU server node within the server cluster comprises (i) one or more GPU devices and (ii) a task scheduling system configured to schedule and dispatch GPU processing tasks to the one or more GPU devices of the GPU server node;

allocating, by a server allocation and scheduling system of the GPU service platform, at least two GPU server nodes within the cluster of GPU server nodes to handle GPU processing tasks specified by the service request, wherein allocating comprises the server allocation and scheduling system sending control messages to the allocated GPU server nodes, wherein the control messages are configured to (i) provide notification that the allocated GPU server nodes have been selected to handle the GPU processing tasks specified by the service request, (ii) specify which GPU server node among the allocated GPU server nodes is designated as a master GPU server node for controlling execution of the GPU processing tasks, and which GPU server nodes among the allocated GPU server nodes are designated as slave GPU server nodes, and (iii) command the allocated GPU server nodes to logically bind together and logically bind their task scheduling systems to establish a single logical task scheduling system which is controlled by the master GPU server node;

sending, by the server allocation and scheduling system of the GPU service platform, connection information to the GPU API executing on the client system to enable the GPU API to establish a network connection to the master GPU server node designated by the server allocation and scheduling system;

receiving, by the master GPU server node, a block of GPU program code of the application executing on the processor of the client system, which is transmitted from the GPU API executing on the client system over the network connection, wherein the block of GPU program code is associated with the GPU processing tasks specified by the service request;

processing the block of GPU program code using the GPU devices of the logically bound master and slave GPU server nodes under the control of the master GPU server node, wherein the master GPU server node utilizes the single logical task scheduling system to schedule and coordinate execution of the GPU processing tasks specified by the service request across the GPU devices of the logically bound master and slave GPU server nodes; and returning, by the master GPU server node, processing results of the block of GPU program code to the GPU API executing on the client system to enable the GPU API to pass the processing results to the application executing on the processor of the client system.

12. The article of manufacture of claim 11, wherein the allocated GPU server nodes logically bind together to establish peer-to-peer communication links.

13. The article of manufacture of claim 11, wherein the service request specifies a number of GPU devices for handling the processing tasks specified by the service request, and wherein allocating comprises determining at least two GPU server nodes within the cluster of GPU server nodes having a combined number of available GPU devices that meet the specified number of GPU devices in the service request.

14. The article of manufacture of claim 11, wherein the task scheduling system of each GPU server node within the server cluster comprises (i) a task queue service module that is configured to enqueue GPU processing tasks in a task queue, and (ii) a task scheduler/dispatcher module configured to schedule execution times for GPU processing tasks that are enqueued in the task queue, and to dispatch the GPU processing tasks enqueued in the task queue to a server backend GPU worker process to handle execution of the GPU processing tasks at their scheduled times using the GPU devices of the GPU server node; and wherein logically binding the allocated GPU server nodes comprises logically binding the task scheduling systems of the logically bound master and slave GPU server nodes to logically establish a single task queue, a single task queue service module, and a single task scheduler/dispatcher module, which are managed by the master GPU server node to control queueing and dispatching of the GPU processing tasks associated with the service request of the client system, and to control the processing of the block of GPU program code using the GPU devices of the logically bound master and slave GPU server nodes.

15. A system, comprising:

a graphics processing unit (GPU) service platform, comprising:

a server cluster of GPU server nodes, wherein each GPU server node within the server cluster comprises (i) one or more GPU devices and (ii) a task scheduling system configured to schedule and dispatch GPU processing tasks to the one or more GPU devices of the GPU server node; and a control server comprising a server allocation and scheduling system configured to:

receive a service request from a GPU application programming interface (API) executing on a client system for GPU processing services provided by the GPU service platform, wherein the service request comprises a GPU API call of an application executing on a processor of the client system which is intercepted by the GPU API and re-directed to the GPU service platform for execution of the GPU API call by the GPU service platform in a manner that is transparent to the application, allocate at least two GPU server nodes within the cluster of GPU server nodes to handle GPU processing tasks specified by the service request, wherein allocating comprises the server allocation and scheduling system sending control messages to the allocated GPU server nodes, wherein the control messages are configured to (i) provide notification that the allocated GPU server nodes have been selected to handle the GPU processing tasks specified by the service request, (ii) specify which GPU server node among the allocated GPU server nodes is designated as a master GPU server node for controlling execution of the GPU processing tasks, and which GPU server nodes among the allocated GPU server nodes are designated as slave GPU server nodes, and (iii) command the allocated GPU server nodes to logically bind together and logically bind their task scheduling systems to establish a single logical task scheduling system which is controlled by the master GPU server node; and send connection information to the GPU API executing on the client system to enable the GPU API to establish a network connection to the master GPU server node designated by the server allocation and scheduling system; and wherein the master GPU server node is configured to:
receive a block of GPU program code of the application executing on the processor of the client system, which is transmitted from the GPU API executing on the client system over the network connection, wherein the block of GPU program code is associated with the GPU processing tasks specified by the service request;

process the block of GPU program code using the GPU devices of the logically bound master and slave GPU server nodes under the control of the master GPU server node, wherein the master GPU server node utilizes the single logical task scheduling system to schedule and coordinate execution of the GPU processing tasks specified by the service request across the GPU devices of the logically bound master and slave GPU server nodes; and return processing results of the block of GPU program code to the GPU API executing on the client system to enable the GPU API to pass the processing results to the application executing on the processor of the client system.

16. The system of claim 15, wherein the allocated GPU server nodes logically bind together to establish peer-to-peer communication links.

17. The system of claim 15, wherein the service request specifies a number of GPU devices for handling the processing tasks specified by the service request, and wherein the control server is further configured to determine at least two GPU server nodes within the cluster of GPU server nodes having a combined number of available GPU devices that meet the specified number of GPU devices in the service request.

18. The system of claim 15, wherein the task scheduling system of each GPU server node within the server cluster comprises (i) a task queue service module that is configured to enqueue GPU processing tasks in a task queue, and (ii) a task scheduler/dispatcher module configured to schedule execution times for GPU processing tasks that are enqueued in the task queue, and to dispatch the GPU processing tasks enqueued in the task queue to a server backend GPU worker process to handle execution of the GPU processing tasks at their scheduled times using the GPU devices of the GPU server node; and wherein logically binding the allocated GPU server nodes comprises logically binding the task scheduling systems of the logically bound master and slave GPU server nodes to logically establish a single task queue, a single task queue service module, and a single task scheduler/dispatcher module, which are managed by the master GPU server node to control queueing and dispatching of the GPU processing tasks associated with the service request of the client system, and to control the processing of the block of GPU program code using the GPU devices of the logically bound master and slave GPU server nodes.

19. The system of claim 15, wherein the cluster of GPU server nodes resides within a single data center.

20. The system of claim 15, wherein the cluster of GPU server nodes is distributed over a plurality of different data centers or computing platforms.

* * * * *